(12) United States Patent
Matteucci

(10) Patent No.: US 7,036,599 B2
(45) Date of Patent: May 2, 2006

(54) METHOD AND APPARATUS FOR CUTTING UNDERWATER STRUCTURES

(75) Inventor: Francesco Matteucci, Genoa (IT)

(73) Assignee: TS Tecnospamec S.r.l., (IT)

( * ) Notice: Subject to any disclaimer, the term of this patent is extended or adjusted under 35 U.S.C. 154(b) by 0 days.

(21) Appl. No.: 10/471,239

(22) PCT Filed: Mar. 15, 2002

(86) PCT No.: PCT/EP02/02902

§ 371 (c)(1),
(2), (4) Date: Sep. 9, 2003

(87) PCT Pub. No.: WO02/075059

PCT Pub. Date: Sep. 26, 2002

(65) Prior Publication Data

US 2004/0069103 A1    Apr. 15, 2004

(30) Foreign Application Priority Data

Mar. 20, 2001  (IT) .................... GE2001A000026

(51) Int. Cl.
*E21B 29/12* (2006.01)
*F16L 55/18* (2006.01)

(52) U.S. Cl. .............. 166/361; 166/55.2; 405/184.3; 83/184

(58) Field of Classification Search ............... 166/358, 166/55.6, 55.2, 298, 55.1, 361; 405/184.1, 405/184.3; 83/178, 181, 184; 175/5, 6
See application file for complete search history.

(56) References Cited

U.S. PATENT DOCUMENTS 3,376,907 A * 4/1968 McNeal .................... 144/24.12
3,479,830 A * 11/1969 Ostarly ..................... 405/172
3,667,515 A *  6/1972 Corey ........................ 83/743
4,109,480 A *  8/1978 Sumner ..................... 405/173
4,143,862 A *  3/1979 Krieg ......................... 266/56
4,168,729 A *  9/1979 Tausig et al. .............. 30/228
4,180,047 A    12/1979 Bertelson
5,042,959 A *  8/1991 Tadatsu ..................... 405/191
5,361,748 A * 11/1994 Matteucci .................. 125/21
5,868,182 A *  2/1999 Burton ..................... 144/34.1
6,267,037 B1* 7/2001 McCoy et al. .............. 83/745
6,789,587 B1* 9/2004 Mossman et al. .......... 144/4.1

FOREIGN PATENT DOCUMENTS

GB             409754       * 11/1932

* cited by examiner

Primary Examiner—Thomas A Beach
(74) Attorney, Agent, or Firm—Stites & Harbison PLLC; Marvin Petry

(57) ABSTRACT

A method for the cutting of underwater structures below the level of the sea bottom on which they are installed, comprises determining an ideal plane of cutting, having considered the characteristic features of the structure i.e. its morphology and its positioning on the bottom, the shape and consistency of the bottom itself, and the depth below the level of the bottom at which the cut must be effected; positioning and anchoring of a cutter in proximity of the cutting area; obtainment of at least one perforation or boring in proximity of the structure through the bottom at least up to the predetermined level for the cutting of the structure, along a direction parallel to the cutting direction and preferably lying on the cutting plane; and introduction of the cutter inside the perforation or boring and cutting of the structure. An apparatus for carrying out the method is also provided.

18 Claims, 10 Drawing Sheets

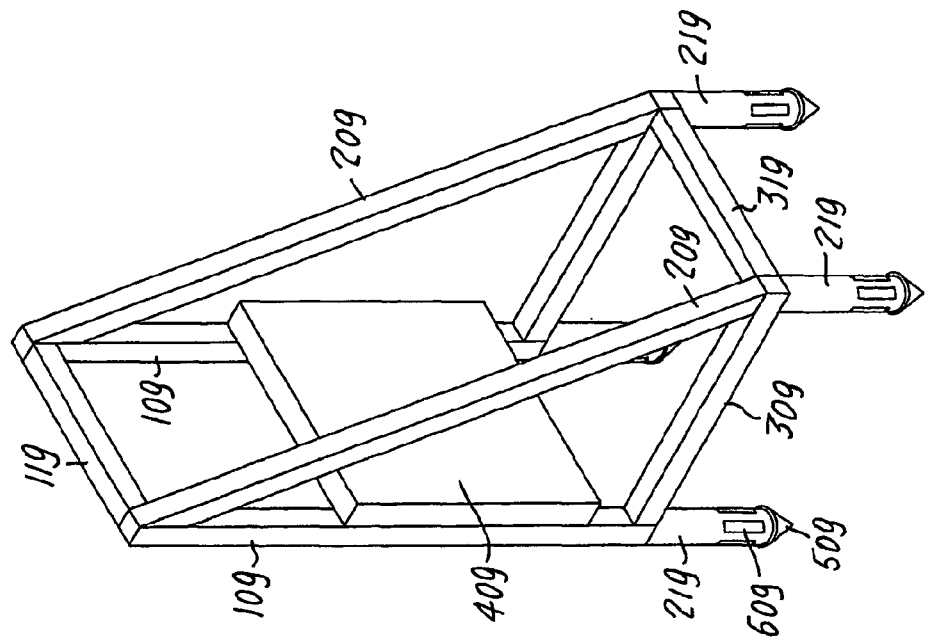
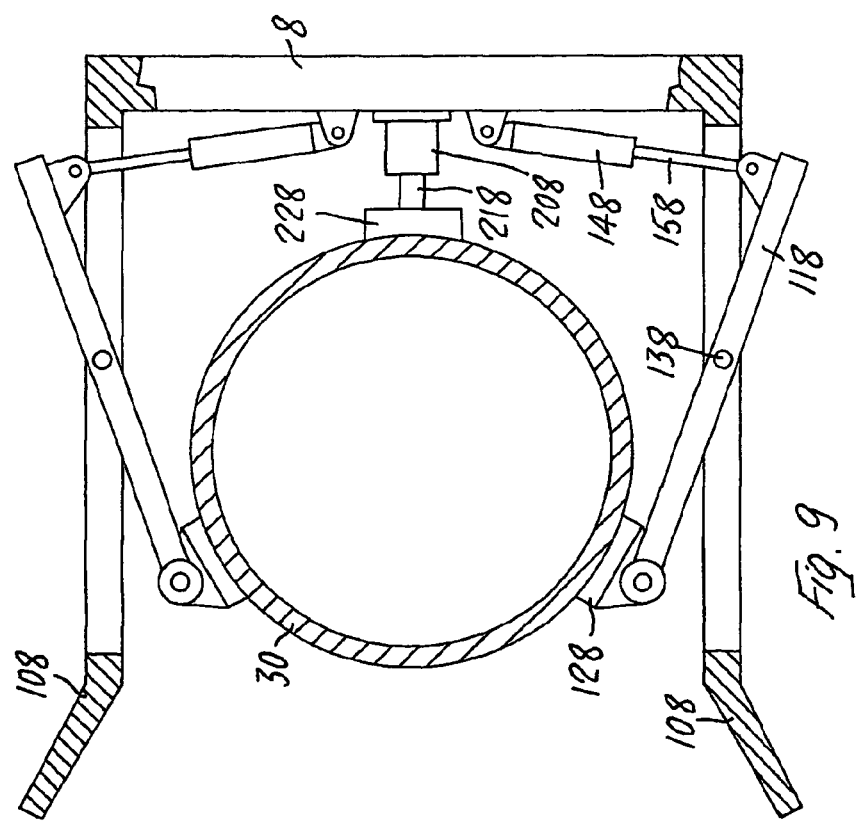
Fig. 11
Fig. 9

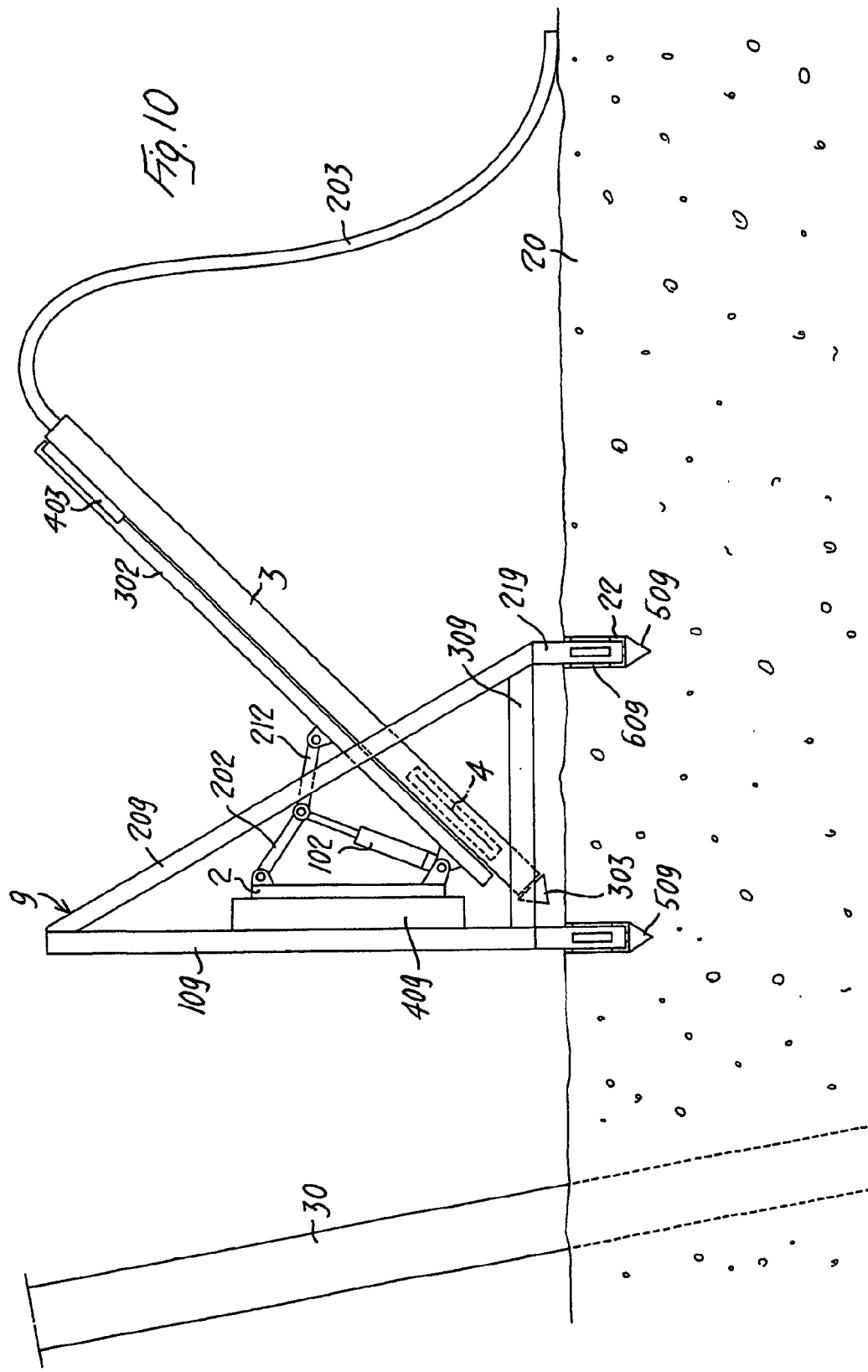

METHOD AND APPARATUS FOR CUTTING UNDERWATER STRUCTURES

FIELD OF THE INVENTION

The present invention relates to a method and an apparatus for cutting underwater structures.

The cutting of submerged structures, with the purpose of removal and/or substitution of same, is presently effected by adopting different methods and by utilising apparatus of different nature.

BACKGROUND OF THE INVENTION

There are known devices for the cutting of submerged structures which operate with fixed blades, such as the one described for example in the document U.S. Pat. No. 3,056,267, or provided with several rotary blades co-ordinated in their action as in the document U.S. Pat. No. 4,180,047. Both apparatus however present the disadvantage of operating only on the emerging and free end of the submerged structure.

In the document EP-B-0 540 834, owned by the same applicant, there is described a method and a device for cutting underwater structures which make use of a diamond cable as cutting means; the device permits the cutting of the underwater structure at any level comprised between the bottom end and the surface.

Presently, the new provisions which are in force practically everywhere, and which are extremely more severe as for what concerns the environmental impact, require that the cutting of the submerged structures cannot be effected by leaving the residual stump of the structure emerging from the (sea) bottom, but instead by effecting the cut below the level of the bottom itself. Under these conditions, by utilising the presently available means, it results necessary to remove a relevant quantity of sea bottom around the base of the structure to be cut. This further operation, besides being costly, is frequently damaging as for what concerns the environment, which on the contrary this type of "underground" cutting would tend to safeguard.

SUMMARY OF THE INVENTION

An object of the present invention is therefore to provide for a method for cutting the underwater structures which permits the cutting below the level of the bottom and with a minimum expenditure of means and of energies, and with an impact with respect to the marine environment which is as limited as possible, obtained with a minimum removal of material from the bottom.

A further object of the present invention Is to provide an apparatus adapted for carrying out the thus conceived cutting method.

One object of the present invention is therefore a method for the cutting of underwater structures below the level of the sea bottom on which they are installed, comprising the following phases:

determination of the ideal plane of cutting, having considered the characteristic features of the structure i.e. its morphology and its positioning on the bottom, the shape and consistency of the bottom itself, and the depth below the level of the bottom at which the cut must be effected;

positioning and anchoring of the cutting means in proximity of the cutting area;

obtainment of at least one perforation or boring in proximity of the structure through the bottom at least up to the predetermined level for the cutting of the structure, along a direction parallel to the cutting direction and preferably lying on the cutting plane; and introduction of the cutting means inside said perforation or boring and cutting of the structure.

According to a preferred embodiment of the method according to the invention, there are obtained preferably two perforations or borings having parallel axes, and arranged in such a manner that the structure to be cut is placed between the said perforations or borings.

The positioning and the anchoring of the cutting means is effected both on the bottom in proximity of the structure to be cut, and onto the structure itself.

A further object of the invention is an apparatus for carrying out the method according to the invention, comprising means for perforation or boring, means for cutting which comprise a cutting frame and a movable cutting unit, means for positioning said perforation means and said cutting means, and anchoring means. Advantageously said perforation means and said cutting frame are associated, and the means for the positioning and anchoring of the perforation means and of the cutting means are the same.

BRIEF DESCRIPTION OF THE DRAWINGS

Further advantages and characteristic features of the present invention will appear evident from the following detailed description of some preferred embodiments of same, made as non-limiting example with reference to the annexed sheets of drawings, in which:

FIG. 9 is a section view along line IX—IX of FIG. 8;

FIG. 10 shows the operation of a further embodiment of the apparatus according to the present invention; and FIG. 11 is a perspective view of the means for supporting the apparatus according to the invention shown in FIG. 10.

DETAILED DESCRIPTION OF THE PREFERRED EMBODIMENTS

Figure 1:
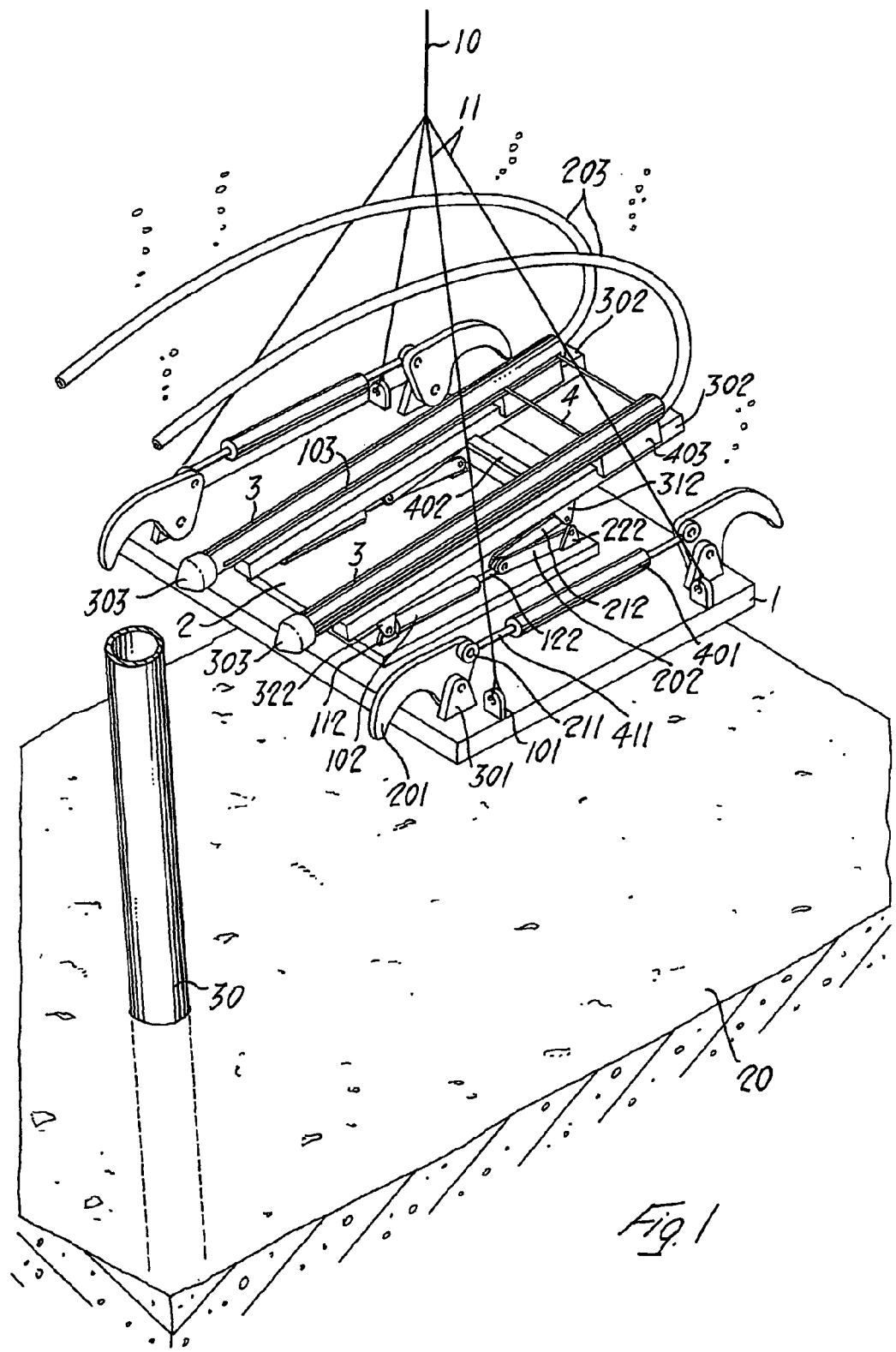
FIG. 1 is a perspective view of a first embodiment of the apparatus for carrying out the method according to the invention, during its positioning in proximity of a submerged structure to be cut.

In FIG. 1 there is shown the apparatus intended to perform the method according to the present invention. Reference numeral 1 designates the supporting base of the apparatus, having a substantially rectangular shape, which is provided in proximity of each of its corners on the upper face with four lugs 101 to which there are secured the lifting rods or cables 11 which connect the base 1 to the haulage cable 10. The base 1 is further provided with means for anchoring to the bottom 20 in proximity of the structure 30 to be cut. The anchoring means comprise claws 201 which are swingable with respect to the ears 301 projecting out of the base 1 and connected to pairs of hydraulic jacks 401, provided with opposed stems 411.

To the base 1, there is connected the plate 2, to the lugs 112 of which there are hinged, at one of their ends, the two guides 302, by means of the flaps 322 projecting out of same. In proximity of the other end the guides 302 are instead connected through the flaps 312 to the articulated arm 202, 212, hinged on its turn to the lugs 222 of the plate 2. The two ends of the branches 202, 212 of the articulated arm which are connected between each other, are connected to the stem 122 of the jack 102 which by its other end is swingably connected to the lug 112. The two guides 302 are united between each other by means of the traverse bar 402.

Onto the guides 302 there are arranged two tubular members 3 which are longitudinally slidable thanks to the slides 403 integral to said members 3, mounted in overhanging manner in the same slides 403. At the end of said tubular members 3 directed towards the end of the guides 302 directly hinged to the plate 2 there are arranged the means for boring the bottom, comprising the boring or cutting heads 303 while at the opposite end of said tubular members 3 there are arranged two ducts 203 for discharging the material removed during the boring of the bottom. On each one of the tubular members 3 there is obtained, facing the other tubular member, a longitudinal slot 103; between the two slots, of which only one is visible in the Figure, there is arranged the cutting tool, comprising the diamond cable 4, movable within the said tubular members 3 by means of devices which will be after illustrated and described.

Figure 2:
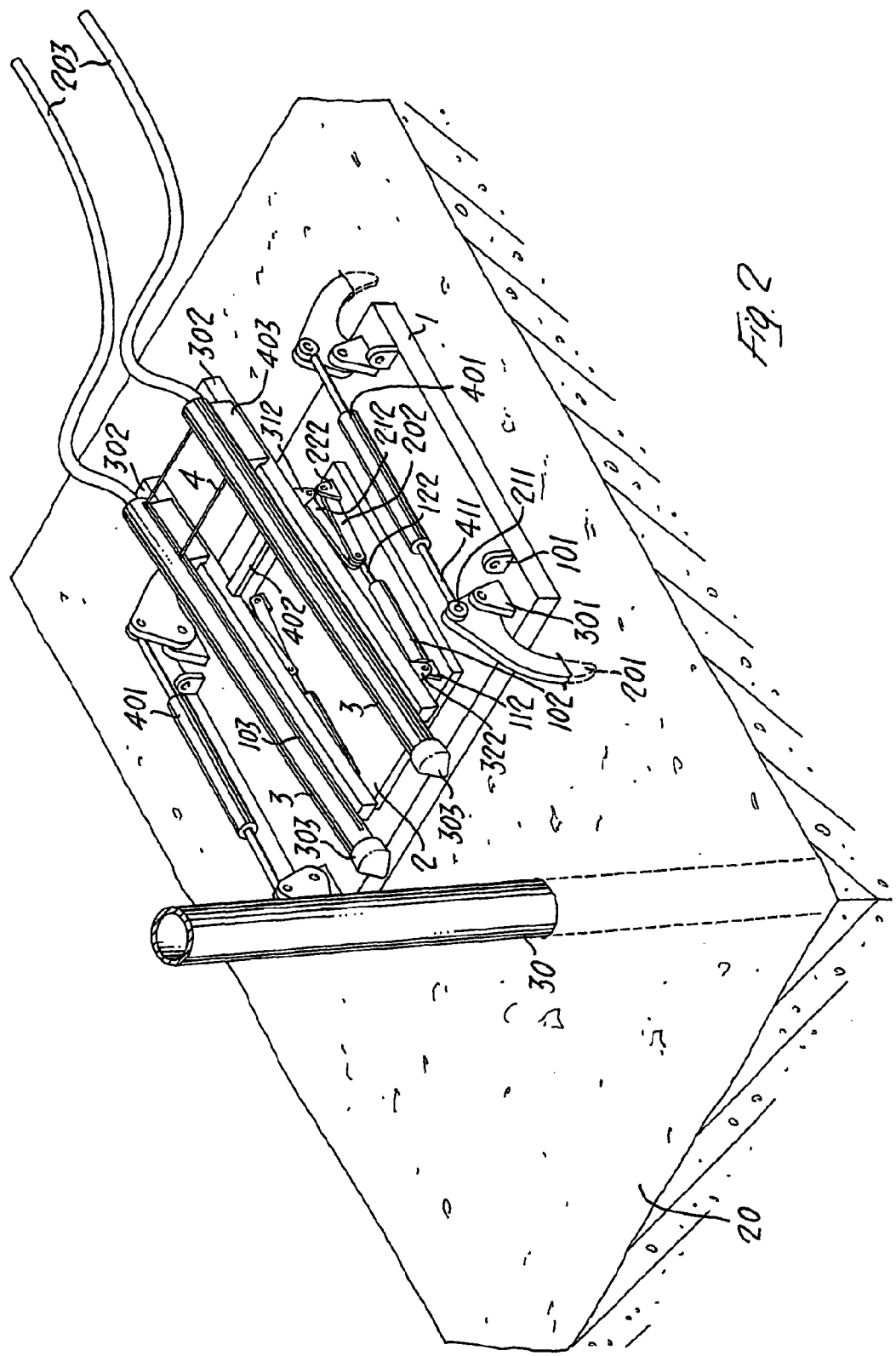
FIGS. 2 to 4 show in succession the operative steps of the method according to the present invention.

In FIG. 2 the apparatus according to the invention has been placed on the bottom 20 next to the structure to be cut 30, and the claws 201, under the action of the jacks 401, have been driven into the bottom itself, thus anchoring the base 1 and setting the apparatus ready for subsequent operations.

Figure 3:
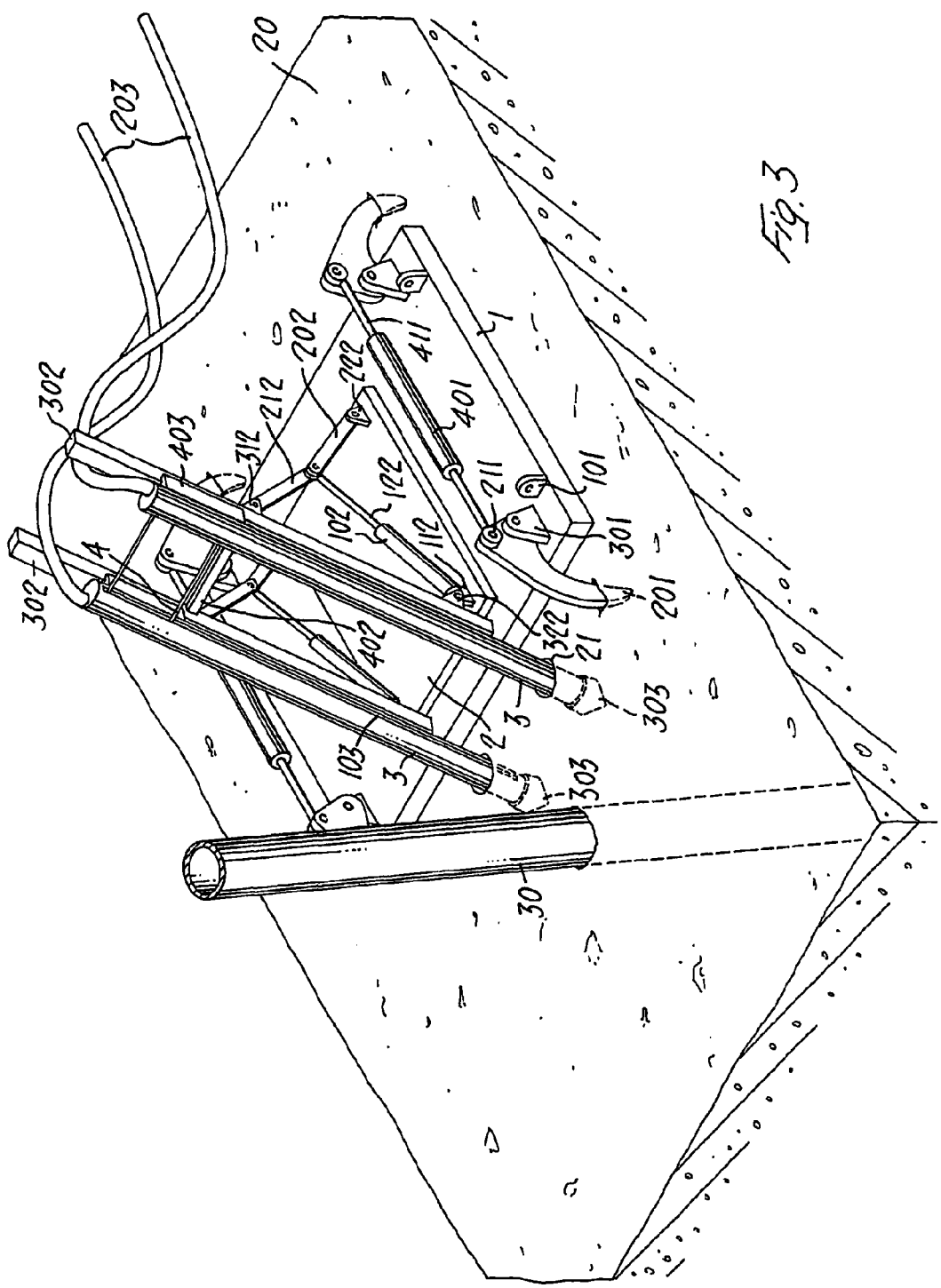

In FIG. 3 the jacks 102 have been actuated so as to lift the articulated arms 202, 212 which act on the guides 302. Consequently the said guides 302 and also the tubular members 3 arranged onto same, have been suitably inclined with respect to the plane of the bottom; the said inclination is selected according to the ideal cutting plane which has been established for the cutting of the structure 30, and which depends substantially from the characteristic features of the structure itself, such as position, section and material, from the characteristic features of the bottom and from the depth at which the cut must be effected below the level of the bottom itself. As soon as the desired inclination has been reached, the tubular members are displaced by means of the slides 403 along the guides 302, and the boring heads 303 penetrate into the bottom 20 thus forming two perforations 21. Said perforations are obtained parallely to the ideal cutting direction of the cutting tool 4, and in such a manner that the structure is comprised between the said perforations. The material removed by the boring heads 303, is suitably conveyed along the tubular members 3 and discharged onto the bottom thanks to the discharge ducts 203.

Figure 4:
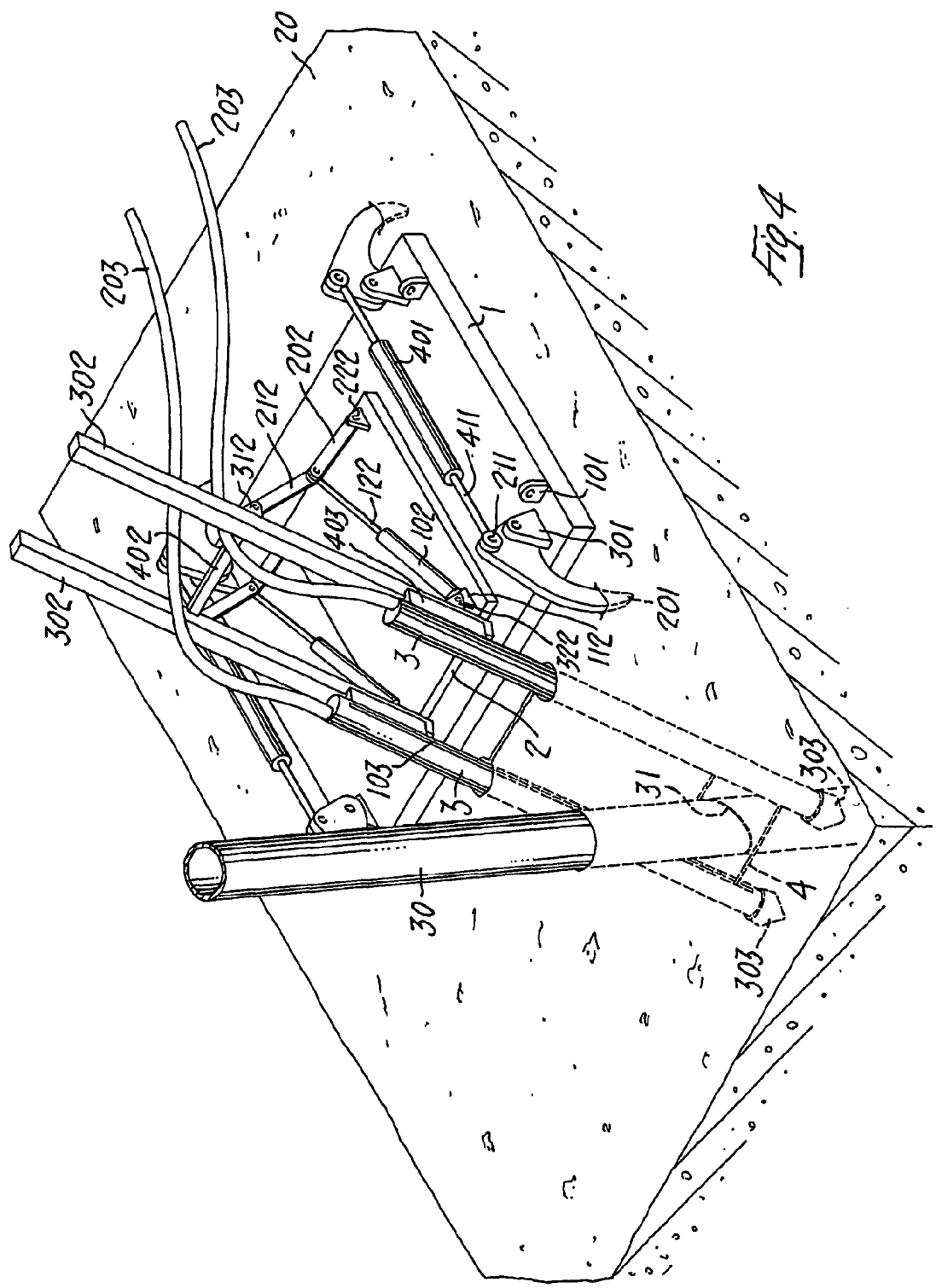

In FIG. 4 the perforation phase of the bottom has been completed, and the boring heads have reached and passed beyond the level at which the cut must be effected. At this point, the cutting means are actuated and the cutting tool 4, that is the diamond cable, is caused to interfere firstly with the portion of bottom comprised between the two perforations 21 and after with the structure 30, thus originating the cut 31. The cutting means can thereafter be retracted up to the position shown in FIG. 3 and the boring heads are extracted out of the respective perforations 21, by causing the slides 403 to slide in opposite direction on the guides 302; the portion of the submerged structure 30 which is located above the cut 31, can be conveniently grasped and removed.

From what above said it appears evident that the method according to the present invention obviates several inconveniences which were encountered up to the present date at the moment in which there should be effected the cutting of submerged structures below the level of the bottom on which said structures are positioned. In fact, instead of the ample excavations around the structure which are necessary up to the present date in order to reach the desired depth, the cutting means are guided inside perforations which remove a minimum portion of the bottom, thus remarkably limiting the environmental impact of the operation, and increasing remarkably the simplicity and rapidity of the action.

Figure 5:
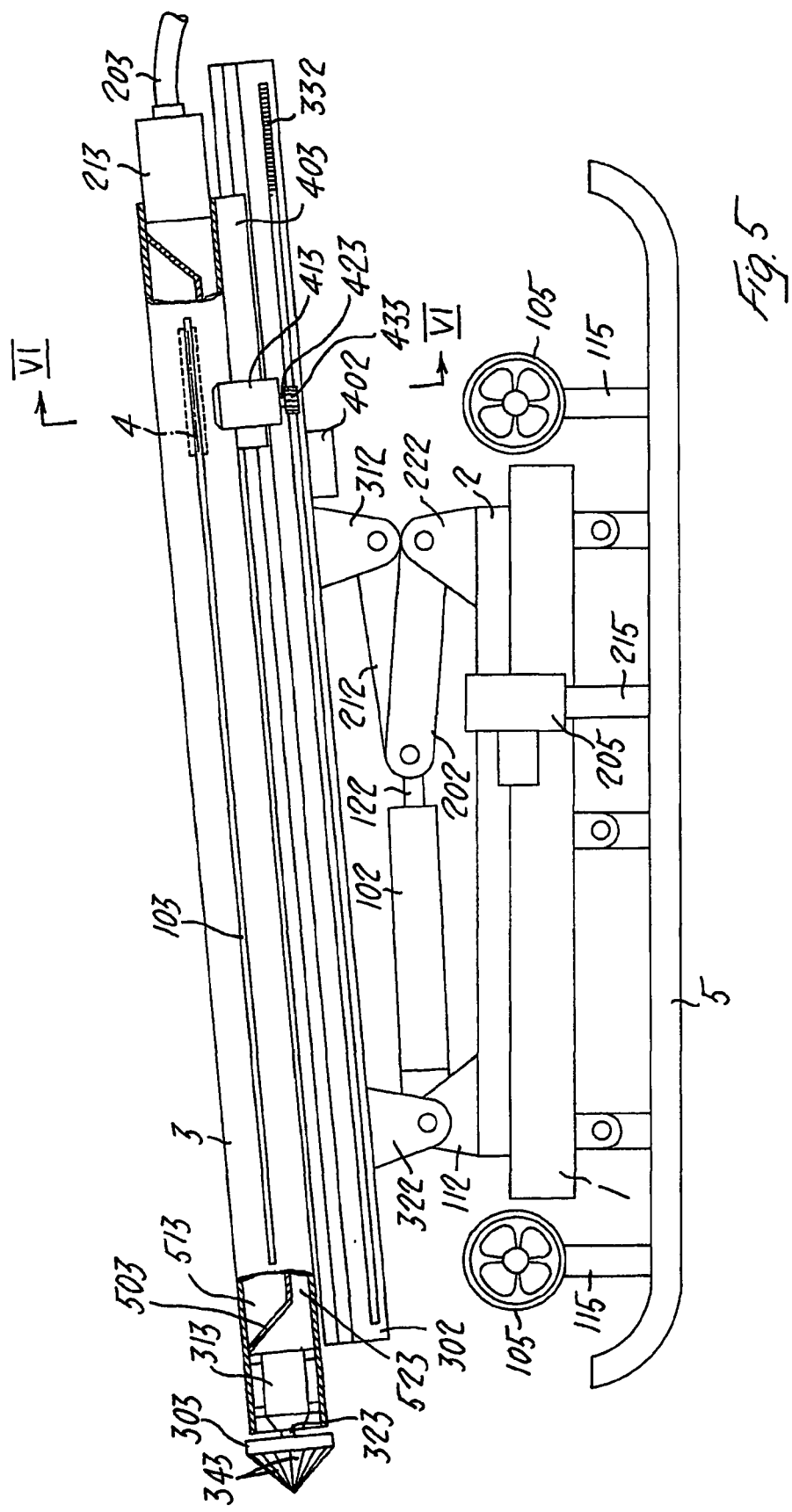
FIG. 5 is a side elevation view with parts in section of a second embodiment of the apparatus according to the invention.

In FIG. 5 there is shown a second embodiment of the apparatus according to the invention; identical reference numerals designate identical parts. In this case the base 1 is mounted on sliding shoes 5, provided with propellers 105 transversely oriented with respect to said sliding shoes and with propellers 205 axially oriented. The propellers 105, 205 are mounted on respective supports 115, 215.

As it can be noted from the Figure, the boring head 303 at the end of the tubular member 3 is keyed onto the shaft 323 of a speed reducer 313; its side wall which has a substantially conical development, according to this embodiment is formed by the blades 343 which are angularly equispaced. In the portion of the tubular member immediately downstream of said speed reducer 313, the wall 503 subdivides the interior of said member 3 into the duct 523 for the discharge of the material removed by the boring head 303 and into the portion 513 inside which there are arranged the cutting means, which communicates with the exterior through the slot 103 in which there slides the cutting tool 4. At the opposite end of the tubular member 3, on the discharge duct 523 there is positioned an aspirator 213, which discharges the debris into the discharge duct 203.

The tubular member 3 is mounted overhanging on the slide 403 which moves along the guide 302 thanks to the speed reducer 423 integral with said slide and which carries on its shaft 423 a pinion 433 which co-operates with the rack 332 arranged on the side wall of the guide 302.

Figure 6:
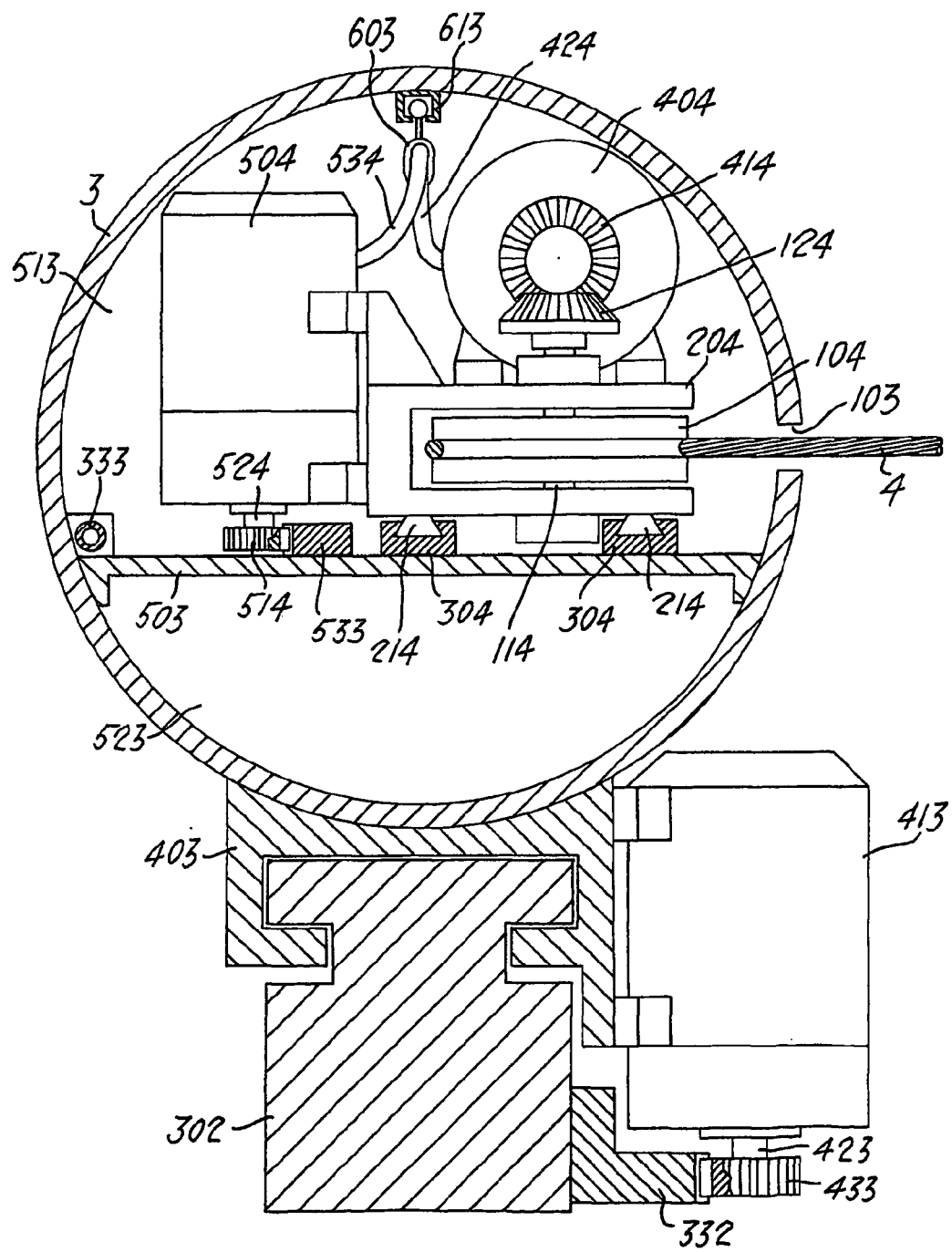
FIG. 6 is a transverse section view along line VI—VI of FIG. 5.

FIG. 6 is a section view along line VI—VI of FIG. 5; at the interior of the tubular member there are arranged the cutting means comprising the cable 4 preferably of the diamond type, which is arranged on the pulley 104, keyed onto the shaft 114 which is inserted in the carriage 204. One end of the shaft 114 is provided with a bevel pinion 124 which engages the bevel pinion 414 of the speed reducer 404 arranged on the carriage 204. The carriage 204 is provided with two sliding shoes 214 which co-operate with the guides 304 connected with the wall 503 which divides the tubular member 3 into the portion 513 and into the duct 523; to the said wall 503 there is also applied the pipe 333 which carries the feeding fluid to the speed reducer 313 of the boring head 302 (see FIG. 5). On the carriage 204 there is overhangingly connected the speed reducer 504 on the shaft 524 of which there is keyed a pinion 514 which engages the rack 533 arranged on the wall 503. The speed reducers 404 and 504 are fed through the pipes 424 and 534 carried by the supporting member 603 movable along the guide 613 formed on the inner wall of the tubular member 3.

The operation of the apparatus adapted to carry out the method according to the invention will appear evident from the following. The positioning of the apparatus on the bottom 30 can be controlled from the surface, as shown in FIG. 1, by means of the haulage cable 10, or the apparatus can be positioned with respect to the structure to be cut by using means placed directly on the apparatus itself, as in the case of the propellers 105, 205 shown in the embodiment of FIG. 5. In both cases, after the positioning and the anchorage of the apparatus, the guides 302 are oriented with respect to the structure to be cut thanks to the jacks 102 which act onto the articulated arms 202, 212 so as to position them on the ideal plane of cutting of the said structure.

Subsequently the speed reducers 413 are actuated to permit the forward movement of the slides 403 which carry the tubular members 3, at the ends of which there are mounted the boring heads 303 which are driven in rotation by the speed reducers 313. As the boring heads penetrate into the bottom 30, the produced debris are conveyed into the ducts 523 provided at the interior of the tubular members 3 and under the action of the aspirators 213 are expelled through the discharge ducts 203.

When the boring heads have reached the suitable depth with respect to the structure to be cut, the perforation is interrupted, and there is actuated the speed reducer 504 which is mounted on the carriage 204 which carries the diamond cable 4, together with the speed reducer which drives the pulley 104 on which there is arranged the cable 4 itself. The cutting means move forward along the tubular members 3, until they meet first the bottom 20 and then the structure 30, into which there is made the cut 31. At this point also the cutting means can be stopped and subsequently retracted by abandoning, if the case, the cable; afterwards the tubular members 3 will be retracted and there will be recovered the structure 30 thus cut.

Figure 7:
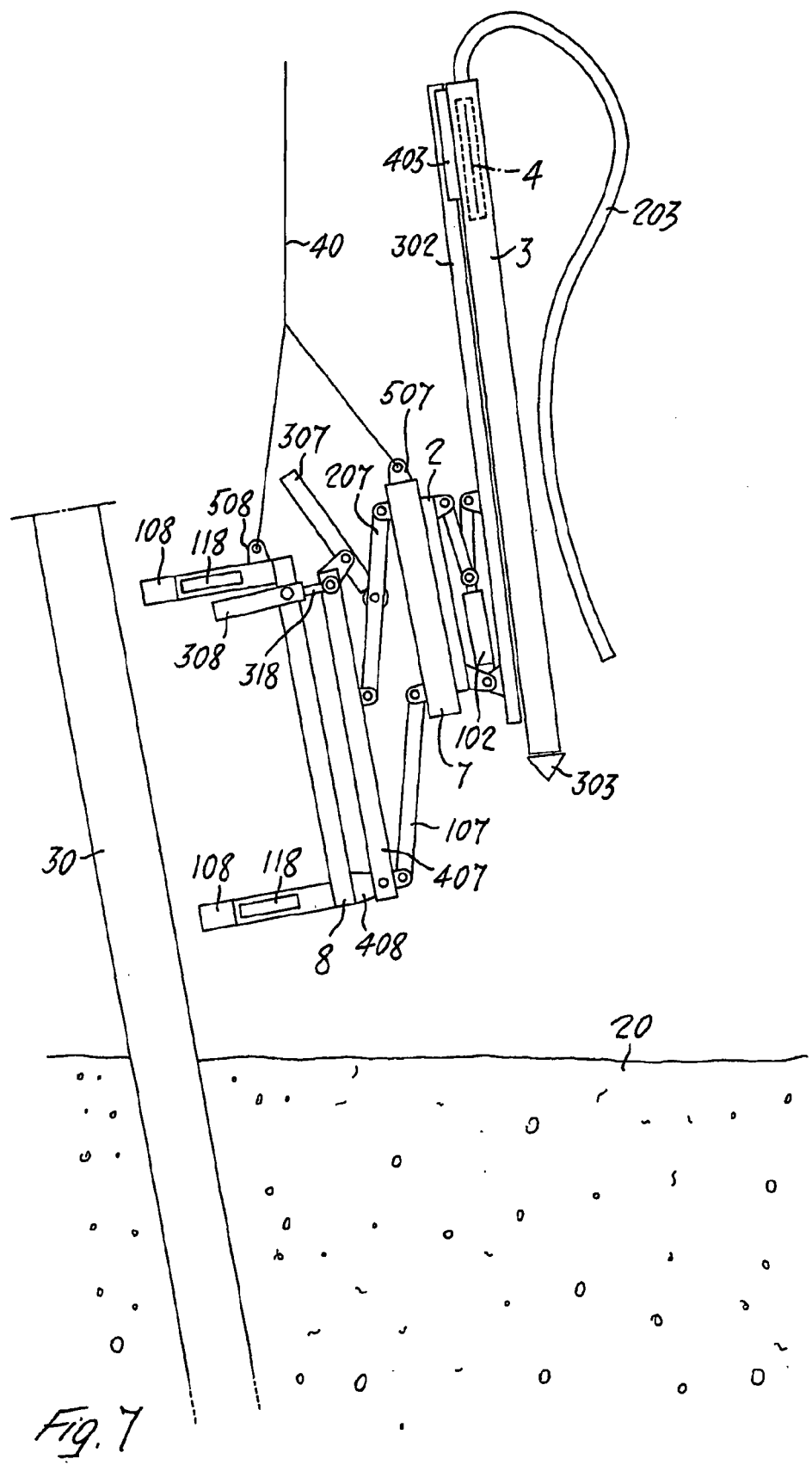
FIG. 7 shows the positioning in proximity of the structure to be cut of a third embodiment of the apparatus according to the invention.

In FIG. 7 there is shown another embodiment of the apparatus according to the present invention; identical reference numerals designate identical parts. In the illustrated case the already described plate 2 is connected to the support 7 which forms together with the movable plane 407 and the levers 107 and 207, which are hinged to both, an articulated parallelogram. To the lever 207 there is connected in a swingable manner the stem of the jack 307 which by its other end is hinged to the plane 407. The said plane 407 is hinged by one end to the lug 408 of the anchoring frame 8, while at the other end it is coupled to the stem 318 of the jack 308 connected to the said anchoring frame 8. The anchoring frame 8 is provided with two anchoring clamps 108, intended to seize the structure 30. The apparatus is connected to the haulage cable 40 by means of the lifting rods or cables 41 which are connected to the slots 508 and 507.

Figure 8:
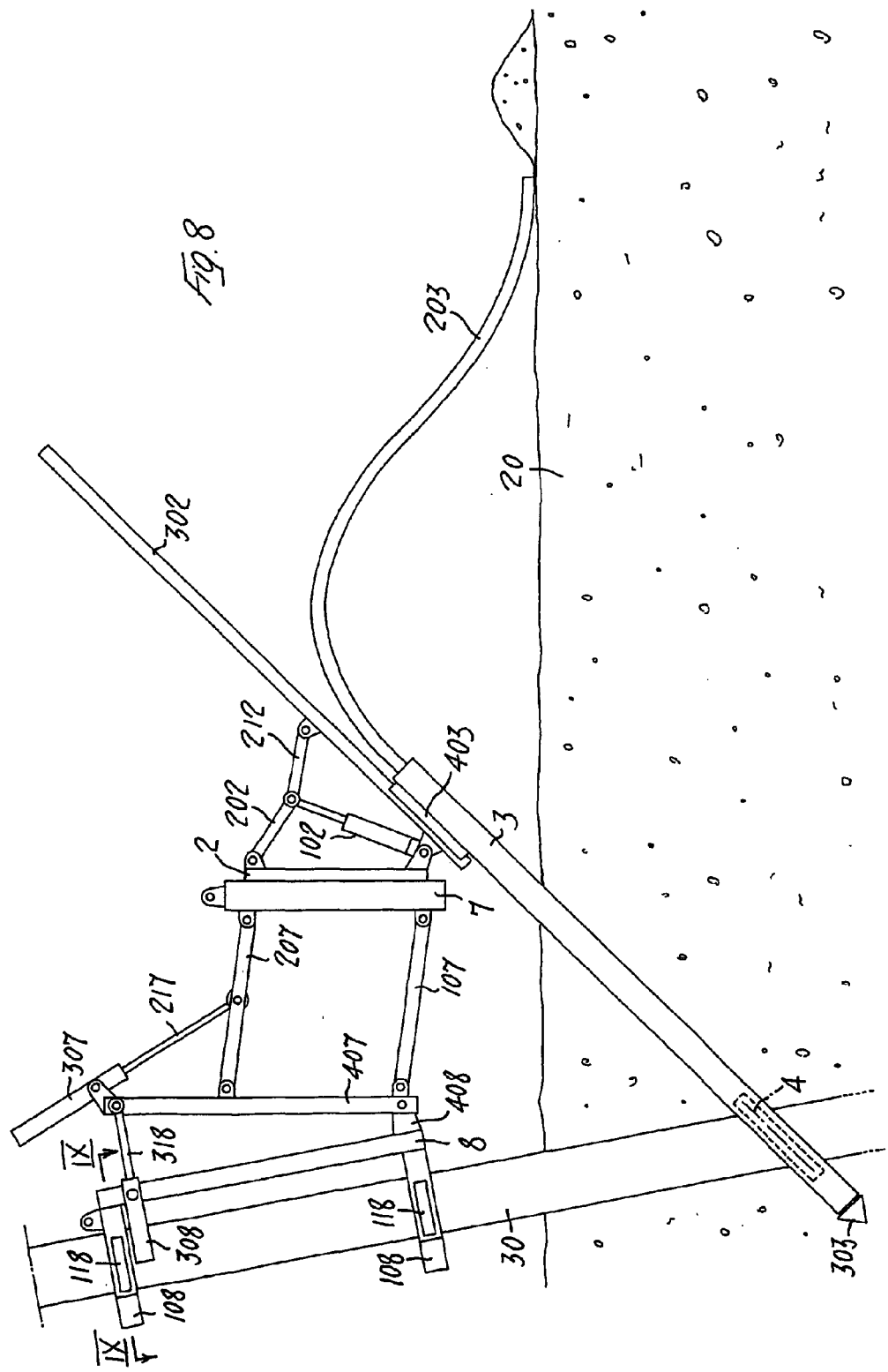
FIG. 8 shows the operation of the apparatus shown in FIG. 7.

In FIG. 8 the apparatus according to the embodiment of FIG. 7 is shown at the end of the cutting phase of the structure, with the tubular members inside the perforations 21 and the cutting tool 4 which has traversed the structure 30 itself. As it can be appreciated, in this case the anchoring of the apparatus is performed directly on the structure 30 itself, and the positioning of the boring means and of the cutting means is obtained thanks to the three, different possibilities of adjustment consented by the articulated parallelogram of the support 7, by the jack 308 of the movable plane 407 and by the articulated arm 202, 212 which, in co-operation with the jack 102, operates on the other hand in a manner analogous to what previously described with reference to the other embodiments of the apparatus according to the present invention.

In FIG. 9 there is shown, in section along line IX—IX of FIG. 8, a clamping jaw 108. Onto the two fixed arms 108 there are mounted, swingable on the pins 138, a pair of rocking levers 118, each of which is provided at one end with a blocking element 128, which is also swingable with respect to the lever 118, and at its other end hinged to the stem 158 of the jack 148, on its turn swingably connected to the anchoring frame 8. Between the two jacks 148 connected to the arms there is arranged a jack 208 on the stem of which there is positioned a blocking element 228 which consents the seizing of the structure 30 and the centring with respect to same.

The advantages deriving from this embodiment are evident; in the first place it is not affected during its operation by any influence connected to the features of the bottom and to its regularity, since the only part which comes Into contact with the bottom is only the one which penetrates the bottom itself, that is the tubular members 3, the boring heads 303 and the cutting tool 4. In the second place the structure 30, after the cutting, remains connected to the support of the apparatus, that is to its anchoring means represented by the clamping jaws 108, and it can be therefore better controlled during its removal.

In FIG. 10 there is shown another embodiment of the apparatus according to the present invention; the plate 2 is mounted onto a base 409 connected to the upright of a stand frame 9 which comprises a diagonal beam 209 and a traverse beam 309; at the end of the diagonal beam 209 connected to the traverse beam 309 as well as at the end of the upright 109 connected to the traverse beam there is provided a foot 219. All the feet 219 are provided with perforation means 509 and with expansion inserts 609. The perforating means 509 generate the bores 22 inside which the foot 219 and the end of the upright are inserted, and the expansion inserts 609 perform the locking in place. As it can be seen in FIG. 11, the stand frame 9 comprises two uprights 109, two diagonal beams 209 and two traverse beams 309, facing each other and connected by the transverse bars 119 and 319.

The support of the apparatus of the invention, conceived in this manner, considerably reduces the space required for the positioning of the apparatus in proximity of the structure to be cut, and therefore can be useful in those cases in which the bottom in its proximity presents irregularities, or a flat bottom portion of limited extension. Moreover the anchoring system appears to be particularly quick and efficacious, capable of adapting itself to extremely difficult ambient situations.

The method according to the present invention and the apparatus for carrying out said method consent therefore to reach remarkable results from the point of view of the rapidity of operation, of the effectiveness and of the environmental impact which is extremely limited.

The invention claimed is:

1. A method for the cutting of underwater structures below the level of the sea bottom on which they are installed, comprising:
    determining an ideal plane of cutting, having considered the characteristic features of the structure including its morphology and its positioning on the bottom, the shape and consistency of the bottom itself, and the depth below the level of the bottom at which the cut must be effected;
    positioning and anchoring of a cutting means in proximity of the cutting area;
    obtaining two perforations or borings having parallel axes in proximity of the structure through the bottom at least up to the predetermined level for the cutting of the structure, along a direction parallel to the cutting direction and arranged in such a manner that the structure to be cut is placed between said perforations or borings;

introducing the cutting means inside said perforations or borings; and cutting of the structure.

2. A method for the cutting of underwater structures below the level of the sea bottom on which they are installed, comprising:

determining an ideal plane of cutting, having considered the characteristic features of the structure including its morphology and its positioning on the bottom, the shape and consistency of the bottom itself, and the depth below the level of the bottom at which the cut must be effected;

positioning and anchoring of a cutting means in proximity of the cutting area;

wherein the positioning and the anchoring of the cutting means is effected on the bottom in proximity of the structure to be cut;

obtaining at least one perforation or boring in proximity of the structure through the bottom at least up to the predetermined level for the cutting of the structure, along a direction parallel to the cutting direction;

introducing the cutting means inside said perforation or boring; and cutting of the structure.

3. The method according to claim 1, wherein the positioning and anchoring of the cutting means is effected onto the same structure to be cut.

4. An apparatus for cutting underwater structures below the level of the sea bottom, said apparatus comprising:

means for perforation or boring;

means for cutting having a cutting frame and one movable cutting unit said cutting frame comprising a plate onto which there are hinged two guides parallel and connected between each other, provided with adjustment means of the inclination with respect to said plate, said perforation means and said movable cutting unit arranged longitudinally movable on said guides, said plate being connected with supporting means;

means for positioning said perforation means, said cutting means and anchoring means;

wherein said means for perforating or boring are associated with said cutting frame and the positioning means of the cutting means and of the perforation means are the same.

5. The apparatus according to claim 4, wherein on said guides there are arranged two tubular members mounted in a cantilever fashion each one on a slide movable on said guides under the action of driving means, said perforation means being arranged at one end of said tubular members and at the interior of said tubular members there being housed said movable cutting unit, the cutting tool being arranged transversely with respect to said tubular means, and passed through two longitudinal slots facing each other and obtained therein.

6. The apparatus according to claim 5, in which said perforation means comprise boring heads formed by a plurality of blades arranged on a substantially conical surface and angularly equispaced, provided with driving means.

7. The apparatus according to claim 5, in which said tubular members each comprise at its interior a discharge duct of the material removed by the said perforation means, and a space for housing said movable cutting unit.

8. The apparatus according to claim 5 in which said movable cutting unit comprises a carriage arranged inside each of said tubular members, movable on guides suitably positioned by driving means, on which there is arranged at least one pulley provided with driving means, which carries a closed loop cable, preferably a diamond cable.

9. The apparatus according to claim 4, in which said supporting means comprise a base substantially flat provided with means for anchoring to the bottom.

10. The apparatus according to claim 9, in which the anchoring is effected due to gravity.

11. The apparatus according to claim 9, in which said anchoring means comprise two or more claws hinged to said base and provided with actuating means.

12. The apparatus according to claim 9, in which said anchoring means comprise two or more feet provided with perforation means and with expansion inserts.

13. The apparatus according to claim 9, in which said base is mounted on sliding shoes.

14. The apparatus according to claim 9, in which said supporting means are provided with means for moving the apparatus.

15. The apparatus according to claim 14, in which said means for moving comprise at least one propeller.

16. The apparatus according to claim 4, in which said supporting means comprise a stand frame substantially formed by two uprights, two diagonal beams and two transverse beams respectively parallel to each other, connected by two transverse beams at the said diagonal beams, said plate being positioned onto said uprights, said stand frame being provided with four feet provided with anchoring means.

17. The apparatus according to claim 4, in which said plate is connected, through adjustable connecting means to an anchoring frame to the structure to be cut, provided with means for clamping the structure to be cut.

18. The method according to claim 2, wherein the positioning and anchoring of the cutting means is effected onto the same structure to be cut.

* * * * *